United States Patent Office 3,838,141
Patented Sept. 24, 1974

3,838,141
BIODEGRADABLE EMULSIFIERS FOR POLYCHLOROPRENE
Nathan L. Turner, Houston, Tex., assignor to Petro-Tex Chemical Corporation, Houston, Tex.
No Drawing. Filed Mar. 7, 1972, Ser. No. 232,533
Int. Cl. C08f 1/13, 3/32
U.S. Cl. 260—92.3      10 Claims

ABSTRACT OF THE DISCLOSURE

Use of alkali metal salts of sulfated and/or sulfonated oleic acid as emulsifying agents in chloroprene polymerization. These salts are biodegradable and replace the non-biodegradable salts of the condensation product of naphthalene sulfonic acids and formaldehyde.

---

Neoprene, or polychloroprene, is conventionally polymerized in emulsion polymerization utilizing a combination of emulsifying agents. Conventionally, emulsifying agents are such as rosin acid salts and various secondary emulsifiers. Some of the emulsifying agents may remain in the polymer but certain water soluble emulsifiers are substantially removed before final isolation and processing of the polymer. These emulsifiers that are removed are sometimes referred to as secondary emulsifiers. For example, the polymer may be recovered by coagulation of the latices and thereafter the water soluble emulsifiers removed before final milling. The water soluble emulsifiers are removed, for example, by washing the polymer with warm water on a wash belt. The washing may be assisted by extraction by use of solvents which dissolve the emulsifying agents but which do not dissolve the polymer e.g. solvents such as alcohol. Normally, the washing requires the use of large volumes of water and if the emulsifying agents are biodegradable this water may be processed by bio-oxidative degradation; however, if the wash water contains non-biodegradable emulsifying agents elaborate and expensive procedures must be employed to remove the non-biodegradable emulsifiers prior to treatment of the wash water in a bio-oxidative degradation system to remove the biodegradable emulsifiers. It is an object of this invention to eliminate this costly processing of the wash water to remove non-biodegradable emulsifiers.

The polymerization of chloroprene is a complicated process and the emulsification system is an integral part of this process. Emulsifying agents must meet certain exacting standards to be satisfactory. Not only must the emulsifiers function during the emulsion polymerization step but they must also perform satisfactorily during the recovery, drying and processing of the polymer. Furthermore, residual emulsifier should not adversely effect the final product. As is well known, there are literally hundreds of commercial emulsifiers and the reason there are hundreds of emulsifiers is that the characteristics of emulsifiers are very specific and must be tailored to particular uses. Therefore, the selection of emulsifiers in any field has become an art which has not been readily subjected to scientific study.

In the polymerization of chloroprene, it has been the practice to frequently include as one of the emulsifiers a salt of the condensate product of naphthalene sulfonic acids and formaldehyde such as disclosed in U.S. Pats. 2,046,757 and 2,264,173. This type of emulsifier is employed to increase the stability of latices especially when the emulsion contains high concentration of electrolytes or in instances in which the other emulsifying agents are poor dispersing agents for the solid polymer. The formaldehyde-naphthalene sulfonic acid condensation products are excellent emulsifiers and, accordingly, have been incorporated in commercial recipes. However, these emulsifiers are washed out of the polymer and are for practical purposes non-biodegradable because the aromatic portion of the salt renders it immune or very resistant to bacteriological decay.

Attempts have been made to substitute biodegradable emulsifiers for the formaldehyde-naphthalene sulfonic acid condensation products, but considerable difficulties have resulted in various steps of the overall process. Some biodegradable emulsifiers did not perform satisfactorily during the preparation of the polymerization emulsion and during the polymerization step. Some biodegradable emulsifiers produced excessive quantities of foam during preparation of the water phase of the emulsion making the solutions difficult to handle. In some cases excessive foam was formed during the emulsification procedure prior to polymerization. Some biodegradable emulsifiers were found to give satisfactory stabilization when added to the latex after polymerization, but when present during the polymerization lost their effectiveness as stabilizing agents, particularly at low pH.

The emulsifiers must also perform satisfactorily during further processing of the polymer. For example, it is conventional to isolate neoprene from the latex by continuous coagulation of a polymer film on a freeze drum followed by washing and drying. The latex is first acidified with an agent such as acetic acid and thereafter fed to a freeze roll which rotates partly immersed in the latex. This freeze roll is cooled to a temperature such as $-15°$ C. by circulating brine. In this process the latex is frozen on the drum and is coagulated as the drum revolves. The coagulated film is stripped from the roll by a stationary knife and is placed on a continuous belt where it is thawed and washed.

Prior to acidification and recovery the emulsifiers must function to properly assist in the isolation and recovery of the polymer. One of the functions of the formaldehyde-naphthalene sulfonic acid emulsifiers is to prevent coagulation of the latex prior to the freeze drum. These emulsifiers are acid stable and prevent such coagulation. Thus, any replacement must satisfactorily maintain the stability of the latex during acidification. Further, the emulsifier must allow for normal stripping of the film from the freeze drum and preferably will assist the stripping operation.

Another necessary characteristic of the secondary emulsifier is that it must be easily washed from the coagulated film and preferably be essentially removed from the polymer prior to the final processing. Residual quantities left must not substantially adversely change the physical properties.

The results of an extensive study to find biodegradable emulsifiers to replace the salts of the condensation product of naphthalene sulfonic acid and formaldehyde in the neoprene polymerization system is reported in my copending application Ser. No. 144,366 filed on May 17, 1971, and entitled "Biodegradable Emulsifiers for Polychloroprene." As reported in the copending application, the attempts to replace the condensation product of naphthalene sulfonic acid and formaldehyde with biodegradable emulsifiers known in the prior art have been generally unsuccessful. However, it has been discovered that in preparation of polychloroprene the alkali salts or sulfated oleic acid can be used in place of the condensation product of naphthalene sulfonic acid and formaldehyde, and that the coagulated polymer produced has excellent physical properties. Further, it has been found that the degree of tack of polymers produced using the biodegradable emulsifiers of the prior art in place of the condensation product of naphthalene sulfonic acid and formaldehyde generally is reduced in comparison to polymers produced using the condensation product of naphthalene sulfonic acid and formaldehyde. The reduced tack effects the handling characteristics of the polymer during production. Specifically, in known polychloroprene processes, the polymer is coagulated in the form of a film, washed, dried and then gathered together to form a strand having the general shape of rope or a thick belt. Polymer having reduced tack is somewhat more resistant to agglomeration into strands than is polymer of greater tack. It has, quite unexpectedly, been found that polymer stabilized during polymerization with salts of sulfated and/or sulfonated oleic acid has equivalent tack of polymer produced using the condensation product of naphthalene sulfonic acid and formaldehyde.

It is a principal object of the present invention to provide a biodegradable emulsifier which can replace the salts of the condensation product of naphthalene sulfonic acid and formaldehyde in the polymerization of polychloroprene. A further object is to provide a biodegradable emulsifier which can replace the salts of the condensation product of naphthalene sulfonic acid and in doing so produces a polymer having the same or nearly the same order of tack as polymers produced using the condensation product of naphthalene sulfonic acid. A still further object of the present invention is to provide a biodegradable emulsifier for use in the polymerization of polychloroprene, wherein the polychloroprene latex during coagulation forms a smooth film of the thickness comparable to polymers produced by using the condensation product of naphthalene sulfonic acid as the emulsifier.

According to this invention polymers of chloroprene, 2-chloro-1,3-butadiene, are polymerized using an alkali metal salt of sulfated and/or sulfonated oleic acid as an emulsifier. The alkali metal is preferably potassium, sodium or lithium with sodium being especially preferred. This type of emulsifier is readily biodegradable. The term "polymers of chloroprene" encompasses polymers in which chloroprene is the major or predominant monomer. Comonomers may also be employed such as 2,3-dichloro-1,3-butadiene; acrylonitrile, methyl methacrylate and so forth. Usually, then a total amount of comonomers will represent no greater than 25 mol percent of the total monomers including chloroprene and preferably will constitute less than 15 mol percent of the total monomers including chloroprene. The polymerization of chloroprene in aqueous emulsion is well known and any such system which does not interfere with the novel characteristics of this invention can be employed. Processes and methods for the polymerization of chloroprene are disclosed, for example, in Encyclopedia of Polymer Science and Technology, Vol. 3, pp. 705–730 (Interscience, 1965) and in numerous patents such as U.S. 2,264,173 and U.S. 2,264,191 both issued on Nov. 25, 1941. The polymerization may be conducted either batch or continuously.

In addition to the alkali metal salt or sulfated and/or sulfonated oleic acid emulsifier, conventional emulsifiers may also be employed such as the salts of rosins and rosin derivatives such as wood rosin, disproportionated rosin or hydrogenated rosin; ammonium, sodium or potassium salts of long chain fatty acids; nonionic surface active agents such as the ethylene oxide or propylene oxide condensation products or compounds containing reactive hydrogen atoms. Addditional emulsifying agents are disclosed in U.S. 2,264,173. However, in order to obtain the maximum benefits of this invention any emulsifier which will be washed out with the wash water should be biodegradable at least to some extent. A preferred emulsifier to be used in conjunction with the alkali metal salts of this invention are the rosin derivative emulsifiers. In this specification rosin or rosinates include the various commercial rosins, the hydrogenated rosins and disproportionated rosins and salts thereof. Rosin base emulsifiers are well known to the art. A particularly preferred rosin emulsifier is a disproportionated wood rosin, purified by distillation (sold by the Hercules Powder Company as Resin 731–SA).

The pH of the aqueous emulsion for polymerization may be varied depending upon the particular emulsification system employed and can be acidic, neutral or alkaline; however, it is preferred to have a pH in the range of about 7 to 13.5. It is also a feature of this invention that preferred results are obtained when the pH is maintained within the range of 10 to 13.

Conventional catalysts for chloroprene polymerization may be employed and preferred catalysts are peroxide catalysts of the organic or inorganic type. Examples of organic peroxides are benzoyl peroxide, cumene hydroperoxide, tertiary-butyl isopropylbenzene hydroperoxide, azo catalysts such as alpha, alpha'-azo-bis-isobutyronitrile and the like. Suitable inorganic peroxides are such as inorganic per acids including per sulfates, perborates or percarbonates e.g. ammonium or potassium per sulfate and hydrogen peroxide. The catalyst may be used in amounts required to bring about polymerization at any desired rate with suitable ranges being from .001 to 0.5 parts by weight per 100 parts of polymerizable monomer.

The usual methods may be employed to prepare an aqueous emulsion of the monomeric material and emulsifying agent and water. The proportions are not critical but generally the monomer will be present in an amount such as from 30 to 60 percent by weight based on the total weight of the composition.

The alkali metal salt of sulfated and/or sulfonated oleic acid with or without other emulsifiers, may be added at any stage during polymerization or may be fed during polymerization. Alternatively, the alkali metal salt of sulfated and/or sulfonated oleic acid may be added to the preformed latex either before or after monomer is removed such as by steam distillation. The only requirement is that the alkali metal salt of sulfated and/or sulfonated oleic acid be present at least during acidification of the latex prior to coagulation. However, because the emulsifiers usually reduce the viscosity of the emulsion during polymerization, it is preferred to incorporate the alkali metal salts of the present invention into the recipe prior to or during polymerization. Although the amount of alkali metal salt of sulfated and/or sulfonated oleic acid is not critical, certain proportions have been discovered to give superior results. A preferred range is from about .05 to 2.0 parts by weight of the alkali metal salt of sulfated and/or sulfonated oleic acid compound per 100 parts of polymerizable monomer with a particularly preferred range being from about .1 to 1.0 parts per 100 parts of monomer.

The usual modifiers or other agents may be present in the emulsion. For instance, the polymerization may be carried out in the presence of sulfur to produce a sulfur modified polychloroprene. Also, chain transfer agents may be employed such as the alkyl mercaptans, e.g. dodecyl mercaptan, iodoform, benzyl iodide and dialkyl xanthogen disulfides e.g. diisopropyl xanthogen disulfide. Water soluble iron salts e.g. ferrous sulfate or iron chelates may be suitably employed.

Normally, the polymerization would be conducted in an oxygen free or substantially oxygen free atmosphere such as use of an inert gas. However, in some processes a controlled amount of oxygen is employed.

The degree of polymerization and characteristic of the polymer can be controlled as is known in the art. The production of either benzene soluble or benzene insoluble polymers is within the scope of this invention. Suitable ranges for the percent of monomer conversion are such as between 60 and 90 percent conversion. The temperature of polymerization may be varied depending upon the particular type of polymer being employed with suitable ranges being from 0° to 90° C. with the preferred range between 15° C. and 55° C.

The polymerization may be short stopped by the addition of agents such as para-tertiary-butyl catechol and thiodiphenylamine. The process of polymerization may be either continuous or may be conducted in batch.

The sodium salt of sulfated oleic acid is an especially preferred embodiment of the alkali metal salt of the present invention and is commercially available under the trade name Nopco 1338C or Dymsol 38C. The commercial product contains some analogs of other fatty acids in smaller amounts than the sulfated oleic acid salt.

In the following examples the sodium salt of sulfated oleic acid was tested as a replacement for the salts of the condensation product of naphthalene sulfonic acid with formaldehyde (commercial condensation products of this type are such as Lomar PW produced by Nopco and Daxad-15 produced by W. R. Grace).

In the examples all parts are by weight unless expressed otherwise.

EXAMPLE 1

A mercaptan-modified neoprene latex in which the condensation product of naphthalene sulfonic acid with formaldehyde was used as the secondary emulsifier or surfactant was prepared using the following recipe:

| Polymerization charge: | Conc. in parts by weight |
|---|---|
| Chloroprene | 100 |
| 2,6-ditertiary-butyl para-cresol | 0.1 |
| Resin-731SA [1] | 3.047 |
| Deionized water | 100 |
| Sodium sulfide | .30 |
| Sodium hydroxide (100 percent) | 0.453 |
| n-Dodecyl mercaptan (100 percent) | 0.225 |
| Sodium salt of the condensation product of formaldehyde and naphthalene sulfonic acid (100 percent) | 0.70 |

[1] A disproportionated wood rosin, purified by distillation and sold by Hercules Powder Co.

Catalyst

An aqueous solution of 0.35 percent potassium persulfate, 0.07 percent silver salt and 1.00 percent isopropyl alcohol was used as required to maintain the polymerization rate.

The polymerization was carried out under a nitrogen blanket at a temperature of 40° C. At 70 percent conversion, the reaction was short-stopped with an emulsion containing 0.01 parts t-butyl catechol, 0.01 parts phenothiazine, 0.2 parts di- and/or mono-octyldiphenylamine, 0.02 parts sodium dodecyl benzene sulfonate, and 0.8 parts deionized water. This latex was then steam distilled to remove the unreacted chloroprene. The pH of the latex was then acidified by adjusting to pH 6.3 with 10 percent by volume acetic acid solution. After the acidification is completed, the coagulated polymer was isolated and the physical properties of the polymer were found to be those shown in Table I.

TABLE I

| | |
|---|---|
| Mooney Viscosity, [1] ML-2¼/4 | 50.5/46.5 |
| Mooney Scorch, [1] time to 5 pt. rise | 17.8 |
| Shore A Hardness, [2] pts. | 37 |
| Tensile,[3] p.s.i. | 2840 |
| Modulus [3] at 300% elongation, p.s.i. | 200 |
| Modulus at 600% elongation, p.s.i. | 725 |
| Elongation percent | 850 |
| Monsanto Rheograph: [4] | |
| Scorch, time to 1 in.-lb. rise | 4.5 |
| Minimum torque, in.-lbs. | 9.5 |
| 40 minute torque ($T_{40}$), in.-lbs. | 53.0 |
| 80 percent cure rate, minutes | 17.5 |
| Brabender Plasticorder (stability), time to 100 meter-gram rise, minutes | 36.5+ |

[1] ASTM D1646-63.
[2] ASTM D2240-64T.
[3] ASTM D412-64T.
[4] Monsanto rheometer showns the curing characteristics of the rubber by continuously plotting torque (in.-lbs.) vs. time (mins.). The various values give a numerical description of the cure. The 40 min. torque reading indicates the optimum state-of-cure of the rubber.

EXAMPLE 2

A mercaptan-modified neoprene latex was prepared by the procedure given in Example 1 with the single exception that 0.413 parts of the sodium salt of sulfated oleic acid was used in place of the 0.7 parts of sodium salt of the condensation product of formaldehyde and naphthalene sulfonic acid. The physical properties of the neoprene latex stabilized with the sodium salt of sulfated oleic acid were found to be those shown in Table II.

TABLE II

| | |
|---|---|
| Mooney Viscosity,[1] ML-2½/4 | 57.0/53.0 |
| Mooney Scorch,[1] time to 5 pt. rise | 16.0 |
| Shore A Hardness,[2] pts. | 37 |
| Tensile,[3] p.s.i. | 2775 |
| Modulus,[3] at 300% elongation, p.s.i. | 200 |
| Modulus, at 600% elongation, p.s.i. | 750 |
| Elongation, percent | 830 |
| Monsanto Rheograph: [1] | |
| Scorch, time to 1 in.-lb. rise | 4.5 |
| Minimum torque, in.-lbs. | 10.0 |
| 40 minute torque ($T_{40}$), in.-lbs. | 54.0 |
| 80 percent cure rate, minutes | 17.5 |
| Brabender Plasticorder (stability), time to 100 meter-gram rise, minutes | 30.5 |

[1] ASTM D1646-63.
[2] ASTM D2240-64T.
[3] ASTM D412-64T.
[4] Monsanto rheometer shows the curing characteristics of the rubber by continuously plotting torque (in.-lbs.) vs. time (mins.). The various values give a numerical description of the cure. The 40 min. torque reading indicates the optimum state-of-cure of the rubber.

EXAMPLES 3 and 4

The following recipes were used to prepare copolymers of chloroprene and sulfur. Example 3 is a comparative run and Example 4 illustrates an embodiment of the present invention. All concentrations are parts by weight.

| Polymerization charge | Ex. 3 | Ex. 4 |
|---|---|---|
| Chloroprene | 100 | 100 |
| 2,5-ditertiary-butyl para cresol | 0.1 | 0.1 |
| Nancy-wood rosin | 5.0 | 5.0 |
| Sulfur | 0.55 | 0.55 |
| Sodium phosphate ($Na_3PO_4$) | 0.30 | 0.30 |
| Deionized water | 150 | 150 |
| Sodium hydroxide (100 percent) | 0.775 | 0.775 |
| Secondary emulsifier: | | |
| (a) sodium salt of the condensation product of formaldehyde and naphthalene sulfonic acid (100%) | 0.718 | |
| (b) sodium salt of sulfated oleic acid (100%) | | 1.312 |

Catalyst System

An aqueous solution containing by weight 3.0 percent potassium persulfate and 0.1 percent silver salt and 1.0 percent isopropyl alcohol was used as required to maintain the polymerization rate.

The polymerizations were carried out under a nitrogen blanket at 45° C. to 84 percent conversion. The reactions were short-stopped with an aqueous solution containing 0.25 part dimethyl ammonium dimethyl dithiocarbonate (DDD) and 3.399 parts deionized water.

After short-stopping, the reaction mixtures were treated with a peptization agent comprising 8.51 parts water, 0.15 parts sodium lauryl sulfate, 6.15 parts chloroprene, 0.00123 parts phenothiazine and 2.20 parts tetraethyl thiuram disulfide (TETDS). The peptization procedure was carried out for 5 hours at 40° C. The latexes were then treated with an emulsion of 0.85 parts butylated hydroxy toluene (BHT), 0.0695 parts sodium dodecyl benzene sulfonate, 4.63 parts deionized water and 2.78 parts chloroprene. The treated latexes were then stripped of unreacted chloroprene by steam distillation and then acidified to pH of 6.3 to coagulate the neoprene. The polymer was isolated and the physical properties thereof determined.

A comparison of the physical properties of the polymer obtained in Examples 3 and 4 is shown in Table III.

TABLE III

|  | Ex. 3 | Ex. 4 |
| --- | --- | --- |
| Mooney viscosity,[1] ML-2½/4 | 58/51.5 | 53.5/47.5 |
| Mooney scorch,[1] time to 5 pt. rise | 40.2 | 43.0 |
| Shore A Hardness,[2] parts | 47.5 | 46 |
| Tensile,[3] p.s.i | 4,100 | 4,075 |
| Modulus,[3] at 300% elongation, p.s.i | 250 | 250 |
| Modulus, at 600% elongation, p.s.i | 750 | 675 |
| Elongation, percent | 950 | 950 |
| Monsanto rheograph:[4] |  |  |
| Scorch, time to 1 in.-lbs. rise | 7.5 | 8.0 |
| Minimum torque, in.-lbs | 15.0 | 16.0 |
| 40 minute torque (T₄₀), in.-lbs | 72.0 | 75.5 |
| 80 percent cure rate, minutes | 5.0 | 7.5 |

[1] ASTM D1646-63.
[2] ASTM D2240-64T.
[3] ASTM D412-64T.
[4] Monsanto rheometer, shows the curing characteristics of the rubber by continuously plotting torque (in.-lbs.) vs. time (minutes). The various values give a numerical description of the cure. The 40 minute torque reading indicates the optimum state-of-cure of the rubber.

A comparison of the latex stabilities of the chloroprene-sulfur polymers of Examples 3 and 4 was made. Equal aliquots of the stripped latexes from Examples 3 and 4 were acidified to a pH of 6.3 and then subjected to rigorous shaking for 15 minutes. The coagulum formed was collected, dried and weighed. The percent coagulum was determined and taken as a measure of the mechanical stability of the latex. The coagulum obtained from the latex of Example 3 was 0.11% and of only a negligible difference to that of the latex of Example 4 which was 0.15%.

The terms sulfated and/or sulfonated oleic acid used hereinbefore encompasses the product obtained treating oleic acid with sulfating and/or sulfonating agents. Oleic acid has the structural formula:

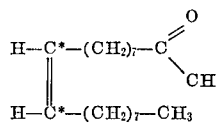

Sulfonation takes place across the double bond and the sulfur containing radical can attach to either of the carbons denoted by the asterisk (*) in the above formula. Thus, the term sulfated oleic acid (illustrated here by the sodium salt thereof) encompasses compounds having the formulae:

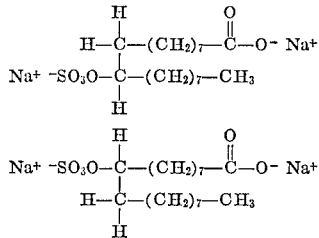

and mixtures thereof.

Similarly, the term sulfonated oleic acid (illustrated here by the sodium salt thereof) encompasses compounds having the formulae:

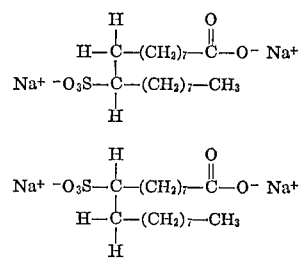

and mixtures thereof.

The invention claimed is:

1. In a process for preparing mercaptan-modified polymers of chloroprene by emulsion polymerization comprising the steps of polymerizing chloroprene monomers in the presence of emulsifying agents, mercaptan modifiers and polymerization catalysts, adding a short-stopping agent to stop the polymerization reaction, acidifying the polymerization reaction mixture to coagulate the polymer latex, isolating the coagulated polymer latex by continuous freezing of said latex in the form of a film on a freeze drum rotating partly immersed in the polymerization reaction mixture, and washing the resultant polymer latex with water to remove water-soluble emulsifying agents, the improvement comprising using a water-soluble biodegradable emulsifying agent comprising a member selected from the group consisting of the alkali metal salts of sulfated oleic acid having the formulae

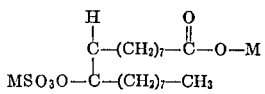

or

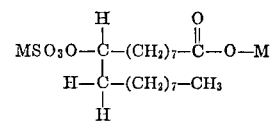

the alkali metal salts of sulfonated oleic acid having the formulae

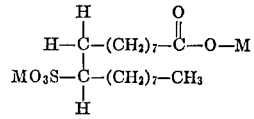

or

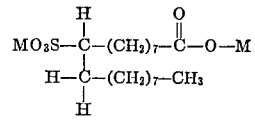

and mixtures thereof wherein M is an alkali metal.

2. The process of claim 1 wherein the said alkali metal in the alkali metal salts is selected from the group consisting of potassium, sodium and lithium.

3. The process of claim 1 wherein the alkali metal is sodium.

4. The process of claim 1 wherein said water soluble emulsifying agents comprise the sodium salt of sulfated oleic acid and a disproportionated wood rosin.

5. The process of claim 1 wherein the said water soluble emulsifying agents also comprise rosin salts.

6. The process of claim 1 wherein said alkali salts are present in an amount of from about .05 to 2.0 parts by weight per 100 parts of polymerizable monomers.

7. The process of claim 1 wherein said water soluble emulsifying agents comprise the alkali metal salts of sulfated oleic acid and a disproportionated wood rosin.

8. The process of claim 1 wherein said water soluble emulsifying agents comprise the alkali metal salts of sulfonated oleic acid and a disproportionated wood rosin.

9. The process of claim 1 wherein said water soluble emulsifying agents comprise the sodium salt of sulfonated oleic acid.

10. The process of claim 1 wherein said water soluble emulsifying agents comprise the sodium salt of sulfonated oleic acid and a disproportionated wood rosin.

References Cited

UNITED STATES PATENTS

| | | | |
|---|---|---|---|
| 1,980,414 | 11/1934 | Lindner | 260—400 |
| 2,185,541 | 1/1940 | Cahn | 260—400 |
| 2,481,876 | 9/1949 | Rhines | 260—23.7 |
| 2,576,909 | 12/1951 | Adams | 260—85.1 |
| 2,743,288 | 4/1956 | Rueggeberg. | |
| 2,394,347 | 2/1946 | Wilder | 260—92.7 |

OTHER REFERENCES

Murray, R. M. et al.: The Neoprenes, Du Pont (1963), p. 32.

JOSEPH L. SCHOFER, Primary Examiner

C. A. HENDERSON, Jr., Assistant Examiner

U.S. Cl. X.R.

260—29.6 SQ, 85.5 XA, 86.3

PO-1050
(5/69)

UNITED STATES PATENT OFFICE
CERTIFICATE OF CORRECTION

Patent No. 3,838,141                    Dated  September 24, 1974

Inventor(s)  Nathan L. Turner

It is certified that error appears in the above-identified patent and that said Letters Patent are hereby corrected as shown below:

Col. 2, line 61 reads "salts or sulfated" but should read --- salts of sulfated ---.
Col. 3, line 52 reads "salt or sulfated" but should read -- salt of sulfated ---.
Col. 4, line 69 reads "range between" but should read --- range being between ---.
Col. 5, line 72 reads "Monsanto Rheometer - showns" but should read --- Monsanto Rheometer - shows ---.
Col. 6, line 19, reads "Monsanto Rheograph$^1$" but should read --- Monsanto Rheograph$^4$ ---.
Col. 6, line 42 reads "2,5-ditertiary-butyl" but should read --- 2,6-ditertiary-butyl ---.
Col. 7, lines 37 & 38 read

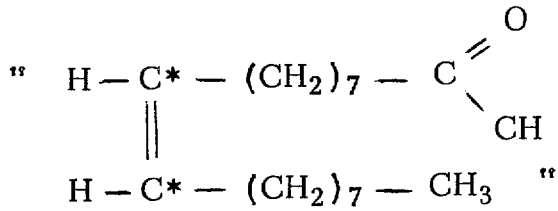

but should read ---

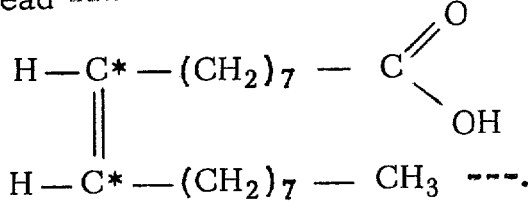

Signed and sealed this 24th day of June 1975.

(SEAL)
Attest:

RUTH C. MASON
Attesting Officer

C. MARSHALL DANN
Commissioner of Patents
and Trademarks